United States Patent
Khanwalkar et al.

(10) Patent No.: US 12,456,387 B1
(45) Date of Patent: Oct. 28, 2025

(54) AUTO-SOLVING MULTIPLE-CHOICE QUESTIONS

(71) Applicant: Learneo, Inc., Redwood City, CA (US)

(72) Inventors: Saurabh S. Khanwalkar, San Mateo, CA (US); John Zhu, San Mateo, CA (US); Alok Goel, Redwood City, CA (US); Johnson J. D'Souza, San Francisco, CA (US); Einar Froyen, Oakland, CA (US)

(73) Assignee: Learneo, Inc., Redwood City, CA (US)

( * ) Notice: Subject to any disclaimer, the term of this patent is extended or adjusted under 35 U.S.C. 154(b) by 0 days.

(21) Appl. No.: 18/752,513

(22) Filed: Jun. 24, 2024

Related U.S. Application Data

(63) Continuation of application No. 18/371,384, filed on Sep. 21, 2023, now Pat. No. 12,057,032.

(60) Provisional application No. 63/448,542, filed on Feb. 27, 2023, provisional application No. 63/446,273, filed on Feb. 16, 2023.

(51) Int. Cl.
*G09B 7/08* (2006.01)
*G06F 16/9032* (2019.01)

(52) U.S. Cl.
CPC ......... *G09B 7/08* (2013.01); *G06F 16/90332* (2019.01)

(58) Field of Classification Search
CPC ............................ G09B 7/08; G06F 16/90332
See application file for complete search history.

(56) References Cited

U.S. PATENT DOCUMENTS

2022/0179991 A1 6/2022 Jha
2022/0300712 A1 9/2022 Bhattacharya
2022/0318202 A1 10/2022 Jha

*Primary Examiner* — Kesha Frisby
(74) *Attorney, Agent, or Firm* — Van Pelt, Yi & James LLP

(57) ABSTRACT

Automated solving of multiple-choice questions includes receiving a question and a set of answer options. It further includes performing a search for contextual passages pertaining to the question and the set of answer options. It further includes providing the question, the set of answer options, and the contextual passages resulting from the search as input to a generative question-answer model. It further includes receiving a model-generated answer as output from the generative question-answer model. It further includes determining a measure of confidence associated with answering of the question by the generative question-answer model. It further includes selecting an answer option from the set of answer options based at least in part on the model-generated answer.

21 Claims, 9 Drawing Sheets

```
{
    "content_id": "12345676",         ← 406
    "content_type": "MCQ",             ← 408
    "subject": "Biology",
    "answer_options": [                ← 410
        "(A) apical complex",
        "(B) syncarion",
        "(C) kinetoplast"
    ],
    "confidence_threshold": 0.92,      ← 412
    "question": "Phylum Kinetoplastida protozoa have a large mitochondrion with a dense mass of DNA called the :"
}
```

FIG. 4A

```
{
    "prediction": "kinetoplast",              ← 422
    "answer_option": "(C) kinetoplast",       ← 424
    "model_version": "1.0.0",
    "confidence": 0.998369574546814,          ← 426
    "passages": [
        {
            "id": "Society of Experimental Social Psychology_0",
            "source": "Wikipedia",
            "text": "The Society of Experimental Social Psychology (SESP) is a..."
        }
    ],
    "content_id": "12345676",                 ⎫ 430
    "content_type": "MCQ",                    ⎭
    "pre_processing_confidence": 0.9282814264297485,   ← 432
    "metrics": {
        "device_type": "cpu",
        "total_inference_time": 0,
        "confidence_model_inference_time": 0,
        "passage_retrieval_time": 0,
        "mcq_inference_time": 0
    }
}
```

Search this document 🔍 | ⤢ | ← → | 6 / 25 | Fit to width ▾ | □ ✎ | ⋯

Is this document missing answers?
Crop or click to get answers and explanations from our expert tutors

[ Get Answers ]

Explanation:
View Answer Workspace Report Discuss in Forum

20. Which of the following according to Milton Friedman is not a key determinant of the demand for money?

A. Aggregate [wealth]         B. Precautionary motive
   C. Relative [rates] of return obtainable    D. Physical non-human capital goods
       on different forms of [assets]           and [human capital] or wealth

Answer & Explanation
Answer: Option B
Explanation:
View Answer Workspace Report Discuss in Forum 21. The cash transactions approach to the quantity [theory] of money is usually associated with the name of:

A. Alfred Marshall           B. Irving Fisher
   C. J.M.Keynes                D. D.H.Robertson

Answer & Explanation
Answer: Option B
Explanation:
View Answer Workspace Report Discuss in Forum 22. The relationship between the market rate of interest and the market price of a [bond] is:

A. Inverse                  B. Direct

602

--- fast as 20 minutes
[ Send question → ]

Need an answer?
Get solutions in as fast as 20 minutes
[ Send question → ]

Need an answer?
Get solutions in as fast as 20 minutes
[ Send question → ]

Answer
B. Direct
[ Get explanation → ]

Question:
*Highlighted in document*

Answer:
B. Direct

Looks like we're missing an explanation
Ask your question to a verified tutor. Get a response in 20 Minutes (or less)

Get explanation

622 — Generated by
Course Hero

Answered by Course Hero Artificial Intelligence aggregating top educational resources

---

Review similar questions with solutions

(Q) Explain why the price of a bond is inversely related to the market interest rate (A) 1) Present value o PV = R1/1+ i o i = interest rate, R 1 = bond pays that much o The present value of any...

(NOTES) 1 view (Q) From the above, the bond price is inversely related to the interest rate

FIG. 6B

Question:
*Highlighted in the document*

> Answer:
> B) Automatic paid - up clause

702

704

Step by step explanation:
Cattell used the factor analysis method to find 16 personality traits/factors. He gave the concepts of the surface traits and source traits. Factor analysis can be explained as a method that statistically describes the variability in observed scores.
Thus, B) is the most appropriate answer ⓵ Generated by  Answer confidence ⓘ  708
  Course Hero ⓘ  HIGH

706

Is this answer helpful?
Your feedback will help us provide a better solution  👍 4  👎 4

Answered by Course Hero Artificial Intelligence aggregating top educational resources.

Answer Source:
House Taken Over RC worksheet week 5.docx

---

Review similar questions with solutions

[Q] Globalization and technology developments have led to some significant changes. Discuss the...
[A] During the 1980s and 1990s, managing the global supply chain required some intense collab...

Answered by Course Hero Artificial Intelligence aggregating top educational resources.

Question Source:
Econ 411 hw Chapter 4.docx

FIG. 7

AUTO-SOLVING MULTIPLE-CHOICE QUESTIONS

CROSS REFERENCE TO OTHER APPLICATIONS

This application is a continuation of U.S. patent application Ser. No. 18/371,384, entitled AUTO-SOLVING MULTIPLE-CHOICE QUESTIONS filed Sep. 21, 2023 which is incorporated herein by reference for all purposes, which claims priority to U.S. Provisional Application No. 63/446,273, entitled AUTO-SOLVING MULTIPLE-CHOICE QUESTIONS filed Feb. 16, 2023 and to U.S. Provisional Patent Application No. 63/448,542 entitled AUTO-SOLVING MULTIPLE CHOICE QUESTIONS filed Feb. 27, 2023, both of which are incorporated herein by reference for all purposes.

BACKGROUND OF THE INVENTION

Multiple-choice questions, where the answer is limited to a small set of choices provided in the question, have been shown to enhance students' learning by helping students revise and practice. It would be beneficial if students could have ready answers to multiple-choice questions, as this would allow them to quiz themselves, assess their own understanding of course content, and move past roadblocks when they are stuck on a particular question.

BRIEF DESCRIPTION OF THE DRA WINGS

Various embodiments of the invention are disclosed in the following detailed description and the accompanying drawings.

FIG. 4A illustrates an embodiment of a data structure representation of a multiple-choice question.

FIG. 4B illustrates an embodiment of an auto-solver output.

FIG. 6A illustrates an embodiment of a document.

FIG. 6B illustrates an embodiment of a learning panel.

FIG. 7 illustrates an embodiment of a learning panel.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
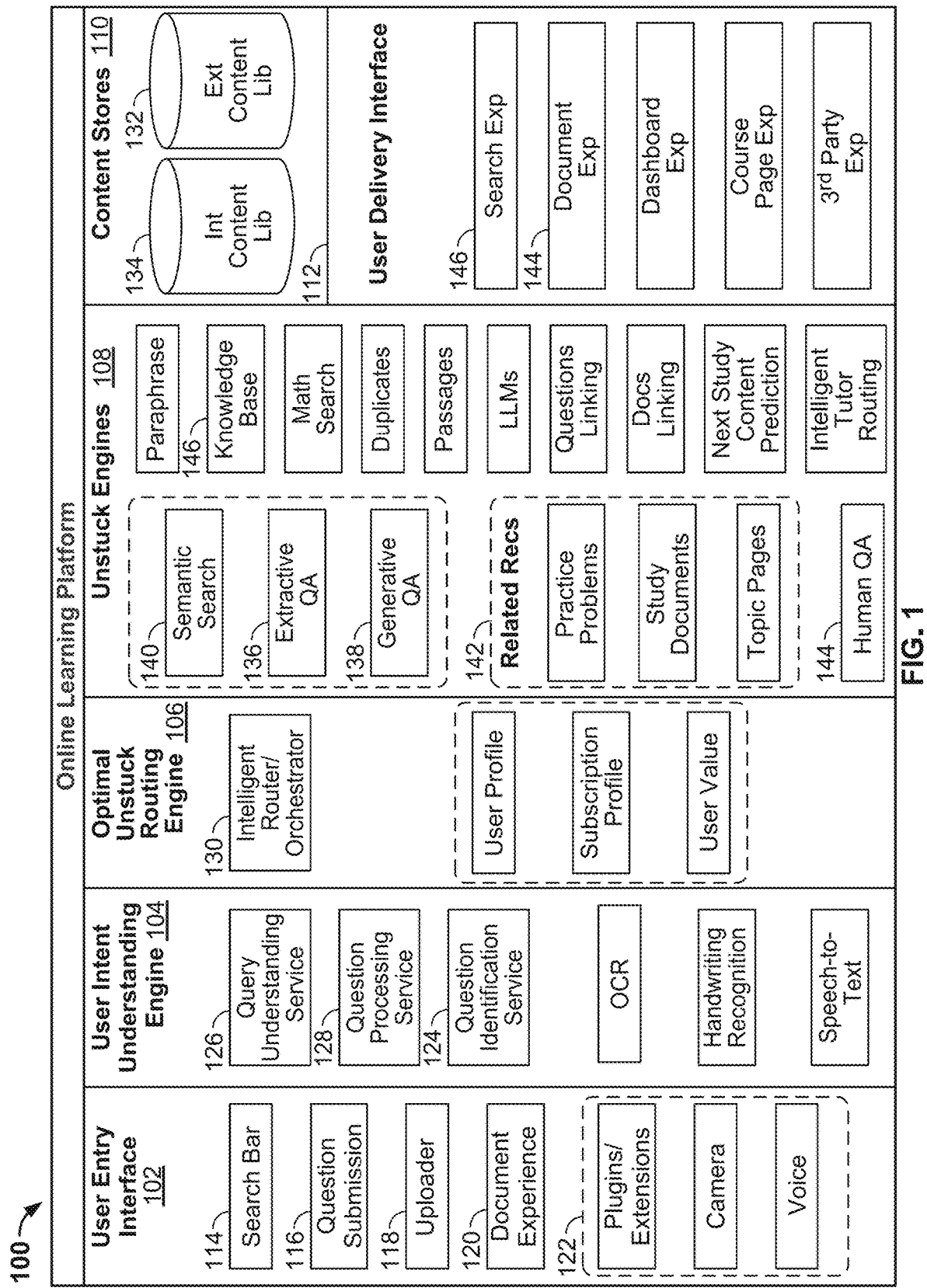
FIG. 1 illustrates an embodiment of an online learning platform.

FIG. 1 illustrates an embodiment of an online learning platform. In some embodiments, the online learning platform 100 is a cloud-based platform that users (e.g., students) are able to access over a network such as the Internet. As one example, online learning platform 100 is implemented on Amazon Web Services (AWS) (or any other cloud provider as appropriate). In some embodiments, the platform is also built on top of Kubernetes as a microservice.

In this example, online learning platform 100 includes user entry interface 102, user interface understanding engine 104, optimal unstuck routing engine 106, unstuck engines 108, content stores 110, and user delivery interface 112.

In some embodiments, user entry interface 102 is configured to facilitate querying of platform 100. User entry interface 102 is configured to provide various interfaces via which users can access the capabilities and services provided by platform 110. As one example, students are able to query the platform by accessing a website. In some embodiments, the website includes a search bar 114 provided by the platform via which users can type in questions and perform searches. In response to the queries, platform 100 provides search results, which in various embodiments include answers to questions, relevant documents, etc. In some embodiments, the search results are retrieved from one or more libraries, such as those included in content stores 110.

The user entry interface also includes an interface 116 for asking questions. As one example, via interface 116, users submit questions. Platform 100 facilitates providing answers or responses to submitted questions, including answers provided by human tutors, or automatically generated answers (e.g., via machine learning or artificial intelligence).

Uploader 118 is configured to facilitate uploading of documents by users. As one example, uploader 118 is an intelligent uploader that is configured to support scanning and uploading of physical documents to platform 100. Uploaded documents may also include questions, and in some embodiments, intelligent uploader 118 is another channel via which users can submit questions to the platform to be answered. For example, questions in the uploaded documents are extracted from the documents and also answered (e.g., via tutors, subject matter experts, automatically, etc.).

As described above, there are various different entry points into the site supported by the platform. For example, the platform provides, via various user interfaces (provided by user entry interface 102), locations at which the user is able to upload or submit documents. The documents may be provided in a variety of formats, such as text formats (e.g., Word documents), PDFs (portable document format), images, etc.

In some embodiments, when a user uploads a document, the uploader service 118 provided by the platform is configured to prompt the user for additional metadata pertaining to the document. Examples of such metadata include when the document was created, the type of the document (e.g., an assignment, essay, notes, etc.), a course value related to a course that the document pertains to, etc. After the user provides metadata about the document being submitted, the user document (with its additional metadata) passes through a processing pipeline. The processing pipeline includes various document enhancement features.

In some embodiments, the platform is configured to intelligently scan the uploaded document. Documents that are uploaded may be in a variety of states. For example, while a document may include questions, it may or may not include answers to all of the questions.

Document experience 120 is an example of an engine or service that is configured to facilitate accessing of existing documents (e.g., from libraries in content 110). This includes, for example, facilitating scrolling through of existing documents, which allows users to observe existing questions and relevant answers in those documents. As another example, users may interact with documents, requesting, for example, unanswered or unsolved questions in the document to be answered.

Further user input interfaces are shown at 122, including browser plugins, as well as interfaces to facilitate uploading of search queries, questions, and/or documents via other input types, such as camera, voice, etc.

User intent understanding engine 104 is configured to determine user intent based on the user input provided via user entry interface 102. User intent understanding engine 104 includes various components. One example component is question identification service 124. Question identification service 124 is configured to identify questions in inputs provided through user entry interface 102. For example, question identification service 124 takes as input documents uploaded via intelligent uploader 118, or existing documents indicated via document experience service 120.

In some embodiments, the question identification is performed by a question identification model. In some embodiments, the question identification model is configured to evaluate the content of a document (e.g., HTML (HyperText Markup Language) content of a document) and identify questions in the document content. In some embodiments, the question identification model performs enhancements such as adding boundary boxes around the identified questions.

In some embodiments, the question identification service is further configured to perform denoising. For example, when identifying subsets of content that include questions, there may be noise in what is extracted. For example, there may be cases where extraneous content or artifacts are extracted along with the question. Such extraneous content (or noise) includes content from other questions (e.g., if a question is spread across two pages), content from another column (e.g., the question is a two-column question), question numbers, point values associated with a question (e.g., text indicating that "this question is worth two points"), etc.

User intent understanding engine 104 further includes query understanding service 126 and question processing service 128. In some embodiments, query understanding service 126 service is configured to interpret a search query provided via search bar 114. In some embodiments, interpreting the search query includes determining a type of the search query. This includes determining, for example, whether the query is a question, or a general search term. Further, for a search query that is determined to be a question, query understanding service 126 is further configured to determine a type of the question, such as whether the question is a multiple-choice question, a free-response question, etc. In some embodiments, query understanding service 126 is further configured to determine contextual information pertaining to a search query, including whether a search query is related to a particular course at a particular school or institution.

In some embodiments, question processing service 128 is a processing pipeline that is configured to process incoming questions. The processing pipeline includes various types of processing. As one example, in response to receiving a submitted question, the processing pipeline is configured to assign the submitted question to a tutor or subject matter expert for answering. In some embodiments, the pipeline processing includes verification of submitted questions, determination of data mining costs, etc. As another example, the pipeline processing includes logic to tag a given question with an appropriate subject, or concepts related to that subject.

In various embodiments, the aforementioned tags are used to facilitate providing improved answers to submitted queries, including providing auto-generated answers and/or providing contextual information with answers, such as explanations, recommended documents based off of course data that is extracted from search query understanding, etc. In some embodiments, the contextual information is provided based on a determination that an answer is unable to be automatically generated.

Optimal unstuck routing engine 106 is configured to take as input the outputs of user intent understanding engine 104. Optimal unstuck routing engine 106 is configured to determine an optimal next step in answering a submitted user input. As shown in this example, optimal unstuck routing engine 106 includes an intelligent router/orchestrator service 130 that routes an input query (e.g., identified question) to a subsequent engine, including, for example, an answering system, a retrieval system, a tutor, etc. In some embodiments, the intelligent router/orchestrator service 130 routes queries to a selected unstuck engine in unstuck engines 108. For example, suppose the student is stuck on a question in the document that they are using to study, and that they have uploaded to platform 100. In this example, suppose that the platform has identified a question in a document uploaded by the user for which there is no existing answer in the document. In some embodiments, the optimal unstuck routing engine is configured to determine how to route the question within the platform to obtain an answer. Three example ways in which the platform facilitates answering of the question include routing the student to a tutor, identifying in the knowledge database an existing answer to a similar question, and/or automatically generating an answer using machine learning and/or artificial intelligence.

Unstuck engines 108 includes various engines usable to provide responses to submitted queries or questions. In some embodiments, the selection of which engine(s) to utilize is based on determinations made by the intelligent router/orchestrator 130. As one example, if a submitted query is a question to be solved, in some embodiments, the engines to be utilized are determined based on the type of question to be solved.

There are various types of engines for determining answers to submitted queries or identified questions to be solved. As one example, a system for automatically solving multiple-choice questions includes the use of a combination of extractive and generative question answering (e.g., using extractive QA (question answering) engine 136 and generative QA (question answering) service (e.g., natural language processing NLP) 138, respectively). Another example of an unstuck engine is semantic search engine 140, which is configured to perform a search of existing documents to determine an answer (from those existing documents). Other tools included in unstuck engines 108 include recommendation (rec) engines 142, as well as human QA (question answering) tool 144 (e.g., tutor). In some embodiments, related recommendation engines 142 are configured to provide recommendations of related content, including related practice problems, study documents, topic pages, etc. For example, determining recommendations is another example of an enhancement provided by the platform, where for example, question recommendation includes surfacing additional questions that would be beneficial for the student to practice on.

Content Stores 110 include various content libraries accessible by platform 100. In various embodiments, the content libraries include external content library 132 and internal content library 134. In some embodiments, such libraries are utilized to facilitate answering of submitted queries. For example, the content libraries include contextual passages that are used by the auto-solving system (that includes, in various embodiments, extractive question answering 136 and generative question answering 138) to automatically answer submitted questions. In some embodiments, answered questions are also stored to the libraries (whether automatically solved, solved by tutors, etc.). In various embodiments, the libraries are implemented using databases (e.g., SQL databases), cloud storage (e.g., Amazon S3 storage), etc. In some embodiments, the content libraries include a historical library of documents, where the documents may also be provided via the intelligent uploader 118 described above. As described above, users may access content (e.g., documents) in a library and/or upload new content to the library.

User delivery interface 112 is configured to surface responses to submitted queries. In some embodiments, in the context of generative answers, the answers are stored in internal content library 134. In some embodiments, once stored in the library, the platform provides various interfaces or surfaces by which users can interact or encounter the answers.

As one example, generated answers are enhancements generated by the platform and exposed to users when looking through document pages, such as by clicking or zooming or otherwise interacting with identified questions in documents that are provided via document experience 144 (which in some embodiments is part of the same interface as document experience 120). If there is an automatically generated answer for a given question in the document, in some embodiments, not only is the answer shown or displayed alongside that question, but additional contextual information is also provided, such as an indication that the answer was generated automatically (e.g., using AI (artificial intelligence) tools). In various embodiments, via the document experience interface, a series of search results including related documents (related to the submitted question) is provided as output of the platform.

In some embodiments, in addition to the document view, answers are also shown or otherwise presented via search experience 146. As one example, suppose a user searches for a question on the platform. If the submitted question matches to an existing question in a library of questions of answers (e.g., maintained in internal content library 134), then the platform is configured to display the appropriate answer. The answer may be displayed or presented in a variety of ways. As one example, the system is configured to provide an answer card. For example, a prepared answer card with both the question and answer is presented. If available, an explanation is also provided in the answer card. In various embodiments, the answers and explanations are provided by tutors, extracted from documents in internal content library 134, are automatically generated, etc.

Auto-Solving Questions

As described above, online learning platform 100 may be utilized to automatically answer unsolved questions provided by users to the platform. The following is an example processing pipeline/path used by platform 100 to receive unsolved questions to be answered, automatically answer the received questions, and provide the automatically generated answers as output back to a user.

Figure 2A:
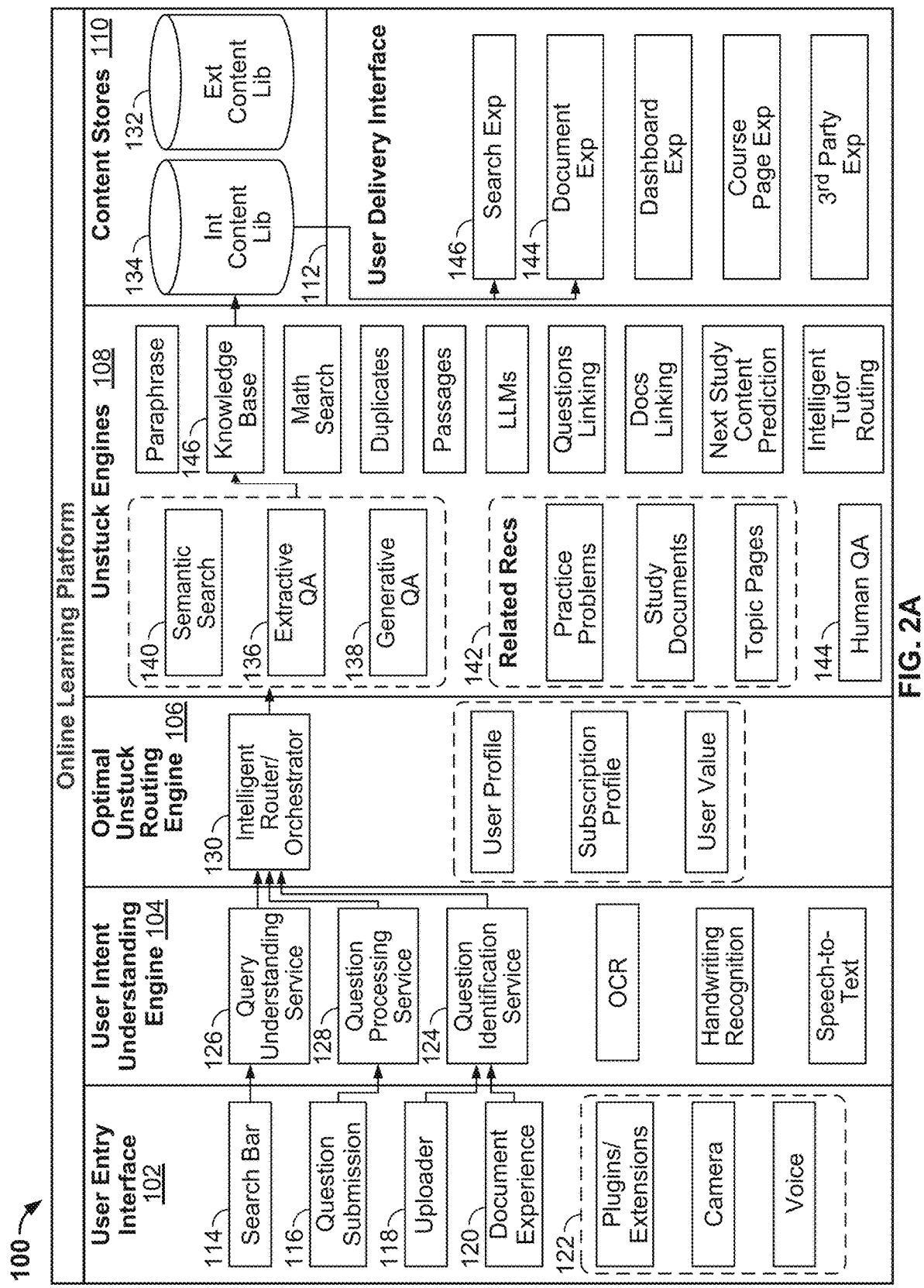
FIG. 2A illustrates an embodiment of a processing path for automatically solving unanswered questions.

FIG. 2A illustrates an embodiment of a processing path for automatically solving unanswered questions. Questions may be obtained in a variety of ways through user entry interface 102, as described above.

For example, platform 100 may receive submissions of unsolved questions through various channels, including via search bar interface 114, question submission interface 116, intelligent uploader 118, and/or document experience 120 of user entry interface 102.

In some embodiments, the questions may be received in a variety of forms. In some embodiments, the questions are submitted directly to the platform. In other embodiments, documents are received that have questions embedded within them.

The questions and/or documents received via user entry interface 102 are passed to user intent understanding engine 104. In this example, questions submitted via question submission 116 are processed by question processing service 128. Documents provided via uploader 118 or document experience 120 are processed by question identification service 124. Question identification service 124 is configured to identify and extract questions from received documents.

The processed questions (processed by user intent understanding engine 104) are then passed to optimal unstuck routing engine 106. For example, intelligent router/orchestrator 130 is configured to determine how to answer received questions. In some embodiments, for questions that do not already have existing answers, the platform is configured to automatically generate or otherwise determine an answer for the unsolved question. For example, platform 100 provides an auto-solving system that is configured to automatically generate answers to questions that have yet to be solved. The auto-solving system utilizes various components of platform 100.

The answers (and explanations) may be provided by the platform from a variety of sources. As one example, answers and explanations include those that were previously extracted from documents already present in the content libraries of the platform. As another example, answers and explanations include those that match with pre-existing tutor provided answers and explanations. As another example, the answers and explanations are automatically generated answers and explanations.

As one example of the logic for processing documents, suppose that a question has been identified in a document.

For the identified question, the platform is configured to determine whether there is an answer present in the document. If so, then the platform extracts the answer. In some embodiments, further processing is performed to validate the correctness of the answer extracted from the document. In some embodiments, if an answer to the question is not present in the document, then the platform is configured to determine whether the question, or a similar question, already exists in the content library or database of the platform. If so, then the pre-existing answer is surfaced. In some embodiments, if there is no answer in the knowledge base of the platform (which accesses libraries in content stores 110), then the platform is configured to route the question to a human tutor or invoke an auto-solver model to automatically generate (using, for example, machine learning/artificial intelligence) an answer to the identified question. The following are further embodiments of invoking an auto-solver system to automatically generate an answer to the identified question.

In this example, to automatically generate an answer for an unsolved question, the intelligent orchestrator routes the unsolved question to one or more services in unstuck engines 108, such as semantic search 140, extractive question answering service 136, and/or generative question answering service 138. As one example, an answer is generated using a generative question-answer model, such as that provided by generative QA service 138. In some embodiments, to answer questions, contextual information obtained from libraries in content stores 110 is utilized. As one example, the contextual information is obtained by utilizing knowledge base 146.

In some embodiments, the results of the auto-solving process are stored in a content library, such as internal content library 134. For example, the question and the automatically generated answer are stored together. Explanations pertaining to the question may also be stored with the question.

The answers and explanations may then be delivered to a user. For example, if the now-solved question had been included in a document submitted by a user, the user delivery interface is configured to, as part of the document experience, provide a learning panel that includes the auto-generated answers and explanations to the questions identified in the user-submitted document.

Figure 2B:
FIG. 2B illustrates an embodiment of a learning panel or answer card.

FIG. 2B illustrates an embodiment of a learning panel or answer card. As one example, when a user performs an internal search, an answer card such as that shown in the example of FIG. 2B is presented. For example, suppose that the user searches for a question, and a matching question and answer is determined in the question/answer database of the platform. In this example, the question was a previously unsolved question that was solved by the auto-solver system described herein. For example, the auto-solving system may be run on-demand (in response to a direct request to answer a question) or run as a periodic batch process (e.g., run overnight on identified, unsolved questions that are scheduled for solving by the auto-solver system).

In the example of FIG. 2B, an example of an answer card that incorporates auto-generated content is shown. In this example, a user performs a search of platform 100 for a question. A matching auto-generated answer to that question is determined and presented. In some cases, multiple candidate answers may be provided. For example, as part of the search, tutor answers, or answers extracted from a document library for that given question may also be returned as search results. In some embodiments, all potential answers to a searched-for question are presented to the user. In some embodiments, the user is provided, via the interface, the ability to select between the auto-generated answer, a tutor answer, an extracted answer, etc. FIG. 2B is an example of an interface provided by search experience 146 of user delivery interface 112.

The following is an example of utilizing the auto-solving service described herein. As one example, suppose a student accesses platform 100 in order to view a document, such as a homework item. The document may have been provided to the platform in a variety of ways. As one example, the student or another user uploaded the document, which is then stored to a library of the platform. Multiple users may then access the document. The document may be accessed due to the student having uploaded it themselves, or via a search for documents that match to a search query input by the user (e.g., via an internal search engine functionality provided by the platform, or direction to the platform from a search made from an external search engine).

In some embodiments, the platform provides various enhancements to documents. For example, documents received and ingested by the platform may already have answers to questions. In other cases, documents are received that do not have answers (or there is a mix of some questions in the document having been answered, and other questions in the document having not been answered). In some embodiments, as part of ingesting a document, the platform is configured to identify questions in documents, as described above.

The identification of questions facilitates further actions and processes. For example, after a document has been enhanced by having questions identified, subsequent users that access the enhanced document are provided various options, such as having an option in a user interface to click on a specific question, which reveals a side learning panel that provides various contextual information about the question. One example of such additional information pertaining to a question is the answer to the question. In some cases, the answer is one that was already identified in the document. In other cases, a match with another tutor-answered question and answer that is determined to be similar to the identified question is presented. As another example, a similar question that has been extracted from another document that has an answer is presented. In some embodiments, the platform provides (e.g., via a user interface) users with the ability to send a question and its answer to a tutor to obtain additional explanation.

In some embodiments, the auto-solving service described herein provides automatically generated answers, in addition to answers that were extracted from the document that a user may have already uploaded, answers that were provided by a tutor, or answers that were extracted from another document with a similar question and answer. That is, the auto-solver model described herein provides an additional source of answers and explanations.

Described in the above example is an embodiment of a document viewing experience that is also applicable to documents that are uploaded via an intelligent scanning experience as well. In some embodiments, when a user uploads a document through an intelligent scanning workflow, as part of enhancing the document, in addition to identifying questions and determining recommendations for related documents, the auto-solving system is configured to automatically generate answers and explanations for identified questions that are determined to be unanswered.

For example, in some embodiments, for an identified question, if an answer does not exist, or if a similar question in a preexisting library of questions is unable to be identified, then in response the auto-solving service is invoked to automatically generate or predict an answer and corresponding explanation.

In this example, for a given question, the auto-solver produces an answer and an explanation. The answer and explanation are then provided as output. For example, the answer and explanation are included in a user interface element such as a contextual learning panel. In some embodiments, an indication is displayed indicating that the answer was generated by an AI (artificial intelligence) model (e.g., was predicted).

Auto-Solving Multiple-Choice Questions

As described above, platform 100 is configured to automatically generate or otherwise determine answers to questions. One example type of question that platform 100 is configured to solve in an automated manner is multiple-choice questions. The following are embodiments of automatically solving multiple-choice questions.

Figure 3:
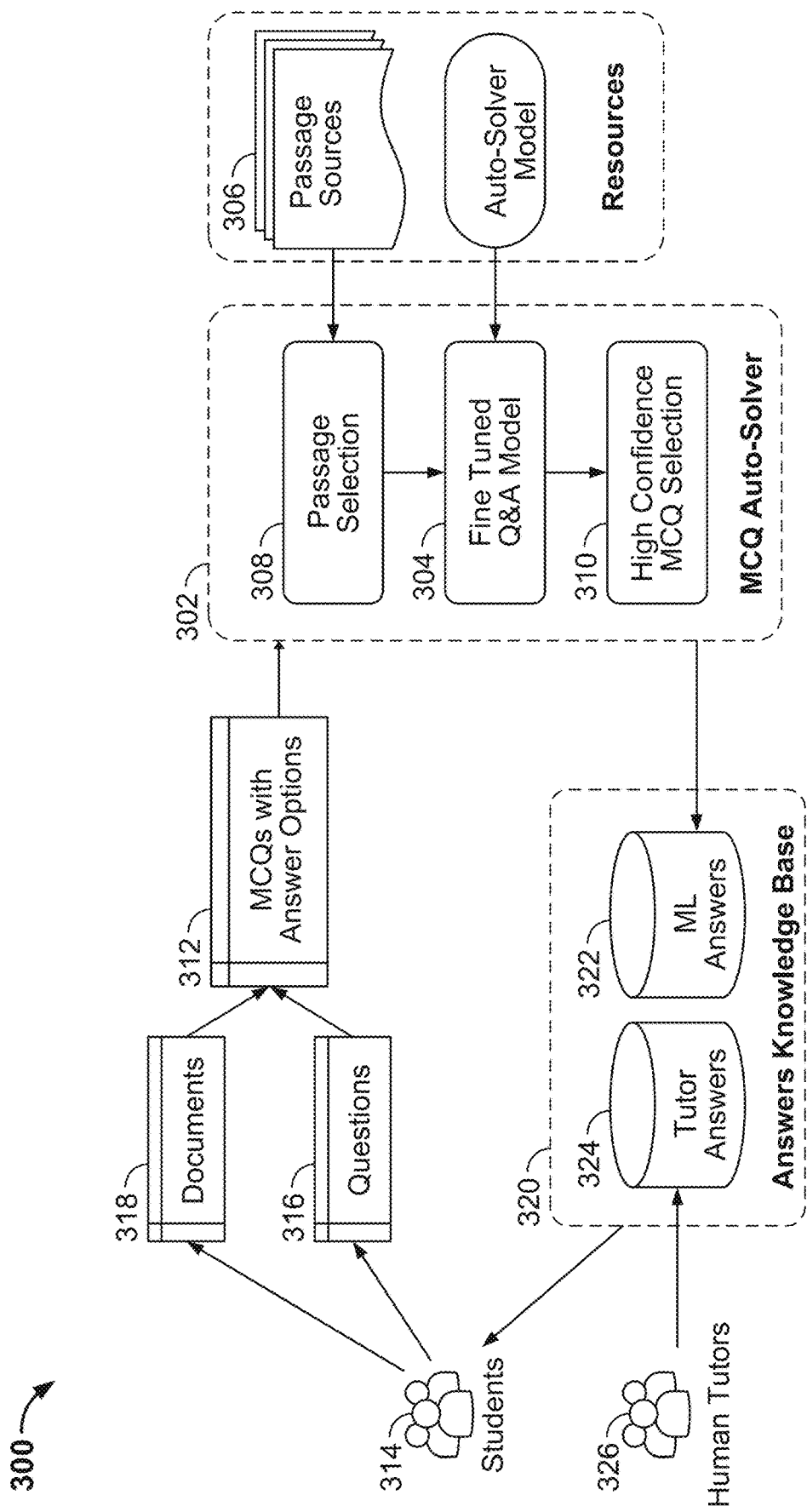
FIG. 3 illustrates an embodiment of a system for automatically solving multiple-choice questions.

FIG. 3 illustrates an embodiment of a system for automatically solving multiple-choice questions (also referred to herein as "MCQs"). In some embodiments, auto-solver system 300 is an alternate view of platform 100, including alternative views of extractive question answering 136 and generative question answering 138 of unstuck engines 108. In some embodiments, the extractive question answering 136 and generative question answering 138 are utilized as a single system for automatically answering multiple-choice questions. In some embodiments, a generative question answering model is used to determine an answer. One example of a generative question answering model is a Macaw-based model, further details of which are described below. Other types of generative models may be utilized. In some embodiments, extractive models are used to perform extractive question answering. In some embodiments, such extractive models are used to determine an answer to a question by extracting an (exact) occurrence of an answer from a passage in a content library (e.g., from content stores 110).

Using embodiments of the automated multiple-choice question answering system described herein, high confidence, highly accurate answers to multiple-choice questions are automatically determined. The MCQ answering system provides near real-time question answering.

In this example, the auto-solving answer system 302 receives a multiple-choice question with corresponding answer options 312. The multiple-choice question and answer options may be received by the platform in a variety of ways. For example, using the user entry interface described above, users such as students 314 may submit questions 316 directly, or submit documents 318 that include the multiple-choice question with answer options. In the case of documents, in some embodiments the question identification service described above is used to extract the multiple-choice question and corresponding answer options.

For example, in the context of multiple-choice questions, to facilitate answering of multiple-choice questions, question identification service 124 is configured to identify boundaries of questions, as well as separately identify the boundaries of each answer option corresponding to the identified question. For example, question identification service 124 is configured to evaluate input text, identify a question portion, as well as separate out answer options.

As described above, the question identification service is configured to extract, from a user submission (e.g., uploaded document), a question and contextual information pertaining to the question. As also described above, in some embodiments, the question identification service is configured to perform denoising to remove any extraneous artifacts from what is extracted from the document in order to obtain only the question text (and answer option text in the context of a multiple-choice question having been identified).

As shown in this example, the MCQ auto-solver system 302 includes a machine learning model 304 that is built/trained to predict an answer given an input question. In this example, the multiple-choice question and corresponding answer options 312 are fed as input to the MCQ auto-solver system.

In some embodiments, the multiple-choice question and answer options are provided as input to question answering model 304. In some embodiments, another type of information that is provided as input to the model is contextual passages that are relevant to the multiple-choice question and corresponding answer options. Examples of contextual passages include paragraphs, sentences, pieces of text, etc. relevant to the multiple-choice question to be solved. In this example, the contextual passages are obtained by performing searches of passage sources 306. In some embodiments, passage selection engine 308 is configured to perform the search for contextual passages. In some embodiments, passage selection 308 is implemented by knowledge base 146, which is configured to search for contextual text (e.g., paragraphs or passages) from libraries in content stores 110. For example, contextual passages used in automatic answering of multiple-choice questions are stored in internal content library 134. In some embodiments, the contextual passages are retrieved from the internal content library and used to determine an answer. For example, the extractive and generative question answering services utilize knowledge base 146 that is configured to access the content stores for contextual information (e.g., aforementioned contextual passages) to support machine-learning model-based automatic solving of multiple-choice questions.

The question-answer model 304 is then configured to predict an answer using the combined inputs (e.g., identified multiple-choice question, corresponding answer options, and identified/returned contextual passages). In some embodiments, the question answering model generates a model-predicted answer. In some embodiments, the model-generated answer is compared to the answer options. The answer option with which the model-generated answer most closely matches is selected. For example, in some embodiments, a generative question answering model is used to generate an answer independently of what the existing answer options are. The model-predicted answer is then compared to the existing answer options. In some embodiments, performing the matching of the model-generated answer to the existing answer options includes performing normalization of the model-generated answer and/or the existing answer options to determine which of the existing answer options matches most closely to the model-generated answer.

In some embodiments, high confidence MCQ selection engine 310 is configured to evaluate the confidence of the QA model's ability to correctly answer the multiple-choice question. In some embodiments, high confidence refers to questions that have a high probability of being answerable by the question-answer model. In some embodiments, confidence scores and thresholds are used to assess the likelihood of correctness of the model-generated answer, the ability of the model to correctly generate an answer for a given question, etc. Further details regarding confidence scoring are described below.

In some embodiments, there are multiple types of confidence measures being computed. One example type of confidence is one provided a question-answerability model (e.g., a BERT-based model confidence of how answerable the question is, described in further detail below), and another other type of confidence is one that a question-answering model (e.g., Macaw-based model) provides for its model-predicted answer. For example, first, there is a BERT sequence classification model that has been fine-tuned on the QA (Question-Answering) model answers' correctness. In some embodiments, this predicts if the question is likely to be answered by the QA model with high confidence. Second, confidence scores are generated by the Macaw-based question-answering model using its output token probabilities. This gives the final confidence estimate of answer correctness. Further details regarding such confidences are described below.

The selected answer option that most closely matches to the model-generated answer is stored to a data store as an answer to the multiple-choice question. In this example, the answers are stored to a machine learning answers data store 322 in answers knowledge base 320, where the knowledge base includes answers generated via other mechanisms, such as tutor answers 324 answered by tutors 326 or subject matter experts.

The following are further details and embodiments regarding auto-solving of multiple-choice questions, including the determination of contextual passages, the determination of confidence measures, training and use of the generative question answering model, etc.

Establishing Contextual Passages

The following are further embodiments regarding contextual passages that are used as input to the multiple-choice question auto-solving model described herein.

In some embodiments, the contextual passages are queried from an internal knowledge base or repository of subject-specific passages (e.g., stored in content stores 110). The following are examples of creating such knowledge bases and repositories.

As one example, an external or third-party information source is accessed. One example of such an information source is Wikipedia. While an example involving Wikipedia is described herein for illustrative purposes, the techniques described herein may be variously adapted to accommodate the determining of contextual passages from other information sources, as appropriate. In this example, passages are created from the content made available by Wikipedia. In some embodiments, separate passage indexes or separate stores for the passages are generated based on the source of the passage. For example, different sources of passages are associated with different corresponding passage search indexes.

In some embodiments, in order to make such passages searchable, a search index is created. As one example, a search index is created in a framework such as OpenSearch. A search engine is provided that queries the search indexes. Queries are then provided to the search engine (which may be both used manually by users, as well as automatically by the auto-solver system), which then identifies relevant passages from the passage search indexes. The search results that are returned are based on matching a query with a set of passages in the passage index. As one example, token-based matching (e.g., using BM25) is performed to evaluate tokens of words in the query, where a determination is made by matching words within a given passage or document. The search engine is configured to identify the best documents or passages given the tokens of the query, which includes identifying, of the available documents or passages, that which is most applicable or has the most overlap with the query (which is based on the question text and a given answer option). In some embodiments, the search results are prioritized or ranked according to relevance.

Extracting Contextual Passages from Sources

The following are embodiments of extracting passages from contextual sources. Sources of contextual information may provide information in various formats. In some embodiments, the platform is configured to extract passages from sources based on the format in which the sources provide contextual information. One example is a source that is in a webpage format. The following are examples of techniques for extracting content out of webpages. As one example, the first subset (e.g., first three lines) of the webpage is extracted and designated as a contextual passage. As another example, the webpage is chunked based on markers such as section headers. As yet another example, tags such as HTML (HyperText Markup Language) div tags are searched for. Each HTML <div> tag is used as an indicator as a source of a passage. The extracted content corresponding to a div tag is then used to construct a contextual passage. As another example, <p> tags defining paragraphs are used to determine the presence of a contextual passage. In some embodiments, metadata in HTML tags are used to determine delimitations of paragraphs.

Multiple-Choice Question Auto-Solving Model

The following are examples and embodiments of generative question-answering models such as model 304. Embodiments of using the generative question answering model at question-answering time are described in further detail below. Embodiments of the implementation of the generative question answering model are also described in further detail below. Training of such a generative question answering model are also described in further detail below. Confidence measures related to answerability of a question by the question-answering model and accuracy of the answer predicted by the question-answering model are also described in further detail below.

As one example, the generative question-answering model is implemented as a fine-tuned question and answer model that is based on an open-source model such as a Macaw model. In some embodiments, model 304 is trained using questions and answers from an internal content library of the online learning platform. Other example types of large language models that may be used include FLAN (Fine-tuned Language Net), LLaMA (Large Language Model Meta AI) and GPT. Further details regarding use and training of the generative question-answering model are described below.

Generating a Model-Predicted Answer to an MCQ

The following are further embodiments regarding using a question-answer model to predict an answer to a multiple-choice question, including using the MCQ auto-solving model during prediction time. In some embodiments, the multiple-choice auto-solving processing described herein is performed on an on-demand basis, such as in response to a user request to automatically answer a question in a submitted document. In some embodiments, the auto-solving processing operates as a background process. For example, the auto-solving system is configured to periodically process batches of questions identified from documents offline.

Generating an Input to the MCQ Auto-Solving Model

The following are embodiments of generating an input to provide to the generative question-answering model, based on which a model-predicted answer is determined.

During inference or prediction time, a question to be answered is identified. Question text and answer options are extracted from the identified question. The extracted question text and answer options are used to generate a query string. The query string that is based on the extracted question text and answer options is passed as a query to a contextual passage search engine, which searches one or more passage search indexes, such as those described above. As described above, in some embodiments, the platform includes multiple passage search indexes, each corresponding to a different type of passage source. The returned passages are then aggregated together as context for the identified question and answer options, where the question text, answer options, and contextual passages are passed as input to the question-answer model. The question-answer model then predicts an answer to the question based on the provided input. The following are further embodiments of generating the input to the MCQ generative question-answering model.

Searching for Relevant Contextual Passages

The following are embodiments of determining contextual passages corresponding to a multiple-choice question to be answered. The following is an example of generating search queries for passages, querying various search indexes such as those described above, and aggregating passages that are search results from the search indexes. In this example, suppose the following question and answer options extracted from an identified question to be answered are:

Question: Which among the following is the most abundant isotope of hydrogen?

Answer Options: (A) Deuterium (B) Elerium (C) Protium (D) Tritium

In this example, there are four answer options for the question text.

For each answer option, the platform generates a passage query string (for querying passage indexes) that is a combination of a given answer option and the question text. In this example, four query strings are generated (as there are four answer options). As one example, a query string for an answer option is generated by concatenating the question text with the given answer option. For example:

Query String 1, based on the extracted question text and answer option (A): [Which among the following is the most abundant isotope of hydrogen Deuterium]

Query String 2, based on the extracted question text and answer option (B): [Which among the following is the most abundant isotope of hydrogen Elerium]

Query String 3, based on the extracted question text and answer option (C): [Which among the following is the most abundant isotope of hydrogen Protium]

Query String 4, based on the extracted question text and answer option (D): [Which among the following is the most abundant isotope of hydrogen Tritium]

The generated query strings are submitted to the passage search engine described above. In some embodiments, the search engine in turn runs searches (based on the query strings) against the available passage search indexes. In this example, the four queries are passed to the passage search engine. For each of the four passage queries, the search engine returns a set of passages as results. In some embodiments, the returned passages are ordered or ranked according to relevancy to the submitted passage query.

In some embodiments, for each contextual passage query, the top N passages that are returned are determined. For example, the top three most relevant passages in the search results are determined and obtained. In the case of the top three most relevant passages for each of the four queries being retained, this results in a total of 12 passages being retained. In some embodiments, for each returned search result (passage), the search engine provides a corresponding matching score, which is a measure of the match between a given passage and the query. In this example, the top three most relevant passages for a query are the three passage results that have the highest matching score with respect to the submitted query (question string concatenated with particular answer option).

For example, a first search of the passage search engine is performed using the first query string (question text concatenated with first answer option, deuterium). The top three passages that are most relevant to the first query string are obtained. A second query is submitted to the search engine, where the second query is the question text concatenated with the second answer option, Elerium. The top three passages most relevant to the second query string are obtained. The third and fourth query strings described above are also submitted and the top three results for each of the third and fourth queries are also obtained, as described above. This results in 12 total passages being obtained.

Vector-Based Searching for Contextual Passages

In the above example, contextual passages are determined by querying a search index using the concatenation of the question text and answer options and performing a token-based match (e.g., text-based search). In another embodiment, contextual passages are determined using a vector-based search.

For example, the question is encoded into a vector that is an array representation of the question. For example, the question (and any other information pertaining to the question, such as the answer options) is encapsulated within a vector (e.g., 512 floating point values, or an array of any another size and data type as appropriate) using an embedding model, which is configured to perform embedding of questions, sentence embedding, etc. In some embodiments, a search infrastructure similar to that described above is utilized, where instead of using tokens, the input question vector in which the question is embedded is used as input to search the entire index of passages. In some embodiments, the passages are encoded in vectors using embedding as described above.

As described above, searches may be text-based or vector-based. In other embodiments, hybrid searches for contextual passages are performed, where both text-based search and a vector representation of question and answer options are used.

Concept Tagging

In the above examples, each passage query string is a combination of the question text and a particular answer option in the set of answer options. In some embodiments, a passage query string is enhanced with further information.

One example of such additional information included in a passage query string is tags. One example type of tag is a concept tag, which is a tag that indicates a concept or category relevant to a question text and/or answer option.

In some embodiments, the platform is configured to identify concepts within the question text and the answer options. As described above, the platform is configured to generate a passage search query that is a combination of the question text and a given answer option. In some embodiments, the passage search query for a given answer option includes the concept tags identified for the question text and the given answer option. When processing a passage search query corresponding to a particular answer option, the use of concept tags allows the search engine to not only rely on the question text and the given answer option, but also rely on additional data such as the concepts that are present in the question text and the particular answer option. This allows for improved and more relevant passages returned as results of a contextual passage query.

In some embodiments, concepts that are found in the question text and concepts that are found in the answer options are determined using a concept tagging model. In some embodiments, given an input, the concept tagging model is configured to provide one or more concepts related to the input. For example, suppose extracted question text and extracted answer options are provided. The extracted question text is passed as a query to the concept tagging model. The concept tagging model provides, as output, concepts related to the question text. Similarly, the answer options are passed as input to the concept tagging model. The concepts related to answer options are also returned by the concept tagging model. The question text and the answer options are tagged with the concepts returned by the concept tagging model.

In some embodiments, the concept tagging model is a system that is configured to identify and tag study-able concepts in English questions (or any other language as appropriate) and documents at a span-level. In some embodiments, the tagging and identifying facilitates linking of mentions of a concept to other resources teaching the concept. This can help students become unstuck by providing a quick explanation for concepts that they do not understand. Providing such explanations saves the students time in understanding concepts. As one example implementation, the concept tagging model is built on top of DBPedia Spotlight. Other implementations may be utilized, as appropriate. In some embodiments, contextual passages are also passed to the concept tagging model, and their concept tags are used to match with the tags of question text and answer options to improve passage relevance.

In various embodiments, the combination of the search and concept tagging techniques described herein improves the ability to find the most relevant contextual passages for a multiple-choice question with answer options. Using the combination of the search and concept tagging techniques described herein, the relevance of contextual passages is increased.

Constructing the Input to the MCQ Question-Answer Model

Continuing with the above example, 12 contextual passages were determined. In some embodiments, the 12 passages provided as results by the search indexes are aggregated together as a single context for the original question to be answered. In some embodiments, the question context (aggregation of 12 passages) is concatenated or otherwise combined with the question text and answer options, where the combination of the question text, answer options, and question context (aggregated passage context) is passed as input to the question-answer model.

The following is one example data model or data structure implementation of an input to the question-and-answer model. The question-and-answer model input includes three components, a question component, an answer options component, and a passage context component. The question component includes the question text extracted from the originally identified question. The answer options component includes all of the answer options extracted from the original question. The passage context component includes all of the passages selected from the results returned in response to the passage search queries described above. In some embodiments, the passage context component includes the corresponding matching scores for the passages described above. The three components of question component, answer options component, and passage context component are passed together as a single input to the question-and-answer model.

The following is one example representation of an input to the generative question-answering model, provided for illustrative purposes.

$question$=Which among the following is the most abundant isotope of hydrogen?; $mcoptions$; $context$.

In the above example, $question$ refers to the question text. $mcoptions$ includes the answer options (e.g., concatenated answer options). $context$ includes the passages (e.g., contextual passages or paragraphs concatenated together).

In the above example, the format for the input to the model is a concatenation of text of the question, options and context—for example: question: Which among the following is the most abundant isotope of hydrogen? (A) Deuterium (B) Elerium (C) Protium (D) Tritium \n Context: <concatenated text of all context passages>. Other types of input data structures and formats may be utilized, as appropriate.

The question-answer model is then configured to predict an answer based on the question text and answer options extracted from the identified question, as well as the contextual passages that were determined as described above.

Accounting for Input Limits

In some embodiments, all contextual passages that are retrieved are included in the input to the question-answer model. Some question-answer models may have limits on the amount of information that can be included in inputs. For example, a Macaw-based model (further details of which are described below) may have a token limit (e.g., limit of 512 tokens) on contextual information that can be included as input to the model. In the above example, the top three passages (which in some embodiments are represented as tokens) for each answer option are extracted, yielding 12 contextual passages. The extracted contextual passages concatenated onto the question text and answer options may exceed the token limit.

In some embodiments, in order to adhere to any token limits, a subset of contextual passages is selected (where some passages are not included as input). As one example, precedence ordering is used, in which, for example, the top passage per answer option is kept. The following is an example of compacting extracted contextual passages to adhere to token constraints.

Consider the example of Table 1, which includes a representation of, for a question (Q) with answer options (A1-A4), extracted contextual passages (P1-P12).

TABLE 1

| A1 | P1  | P2  | P3  |
|----|-----|-----|-----|
| A2 | P4  | P5  | P6  |
| A3 | P7  | P8  | P9  |
| A4 | P10 | P11 | P12 |

As described above, the question and each answer option are used to perform a query to obtain contextual passages relevant to that combination of question and particular answer option. In this example, the top three most relevant passages (e.g., based on relevance scores) are obtained. In this example, based on a query using question Q and answer option A1, contextual passages P1, P2, and P3 are retrieved. In this example, P1, P2, and P3 are sorted in order of relevance where P1 was determined to have been the most relevant of the three paragraphs, P2 being the next most relevant, and P3 being the next most relevant after P2. Similarly, for question Q and answer option A2, contextual passages P4, P5, and P6 are retrieved, with P4 being the most relevant. For question Q and answer option A3, contextual passages P7, P8, and P9 were retrieved, with P7 being the most relevant. For question Q and answer option A4, contextual passages P10, P11, and P12 were retrieved.

As an example first step, all 12 contextual passages are concatenated together. The number of total tokens is determined. If the number of total tokens exceeds a token limit, then a subset of the contextual passages is selected. For example, suppose that the number of tokens for all 12 contextual passages and question text exceeds 512 tokens. A first subset of the contextual passages are then taken. For example, the first subset includes, for each answer option, the top passage. In this example, P1, P4, P7, and P10 are selected and concatenated together as a first subset. This subset of top passages for each answer option is then evaluated to determine whether the number of tokens in this subset exceeds the token limit. If not, then the next most relevant passage for the first answer option (e.g., A1) is then added to the group and it is determined whether the limit has been reached. If the limit has not been reached, then the next most relevant passage for the second answer option (A2 in this example) is added. In this example, each of the answer options is considered to be equally likely to be correct, and the answer options may be ordered in any manner as appropriate. The process of adding contextual passages continues until the limit is met or exceeded.

In some embodiments, if the inclusion of a contextual passage causes the limit to be exceeded, then that contextual passage is removed from the set of input contextual passages. For example, if P1 and P4 are already close to the limit, and the inclusion of P7 would cause the token limit to be exceeded, then P7 (and the other context passages) are not included. That is, context need not be provided for each answer option. In other embodiments, a passage is partially included. For example, a passage may be composed of multiple tokens. The passage is truncated to include a partial subset of tokens up until the token limit is reached.

As described above, in some embodiments, each answer option is considered to be equally probable as correct, and the selection of which answer option for which a contextual paragraph is taken (as opposed to for another answer option) is unbiased, and is done, for example, according to how the answer options were stored in a data structure. In some embodiments, the ordering of the answer options in the data structure is changed and the question-answer model is run multiple times with different combinations of contextual passages (determined due to token limits). By doing so, the (potential) impact that the changing of the ordering of answer options has on output accuracy is diffused. In other embodiments, if statistics are known on which answer options are more likely to be probable, then such statistics may be used to affect which contextual passages (for which answer options) are kept, and which are filtered out (e.g., prioritize including passages for more probable answer options for a multiple-choice question).

Matching Model-Generated Answers to Existing Answer Options

After constructing an input of question text, answer options, and contextual passages, the combined input is provided to the generative question-answering model. The generative question-answering model then provides as output a model-generated answer. The model-generated answer predicted by the question-answering model is not necessarily a selection from the answer options.

In some embodiments, the selection of an existing answer option as the correct answer is determined by selecting the existing answer option that matches closest to the model-generated answer. The following are embodiments of selecting an answer option based on the model-predicted output.

As described above, the model-generated answer that is provided as output of the question-answer model is not necessarily one of the existing answer options. When passing question text, answer options, and contextual passages to the question-answer model, the generative question answering model may provide a model-generated answer that is outside of the answer options.

In some embodiments, each of the existing answer options is compared against the model-generated answer to determine how closely a given existing answer option matches to the model-generated answer. If an existing answer option matches to the model-generated answer within a threshold, then that existing answer option is selected as the correct answer for the multiple-choice question.

In some embodiments, the comparison to determine an amount of match between an existing answer option and the model-generated answer is performed by determining a measure of distance between the existing answer option and the model-generated answer. Character or string or edit distances are examples of measures of distance computed between the existing answer option and the model-generated answer. In some embodiments, the existing answer option with the smallest distance to the model-generated answer is selected as the correct answer option for the multiple-choice question.

In some embodiments, normalization is performed to allow non-exact or fuzzy matching between the answer options and the model-predicted output. In some embodiments, equivalents or variations of the model-generated answer are determined and compared to existing answer options. For example, suppose that a model-generated answer is "GDP" and an existing answer option is "gross domestic product." In some embodiments, if the model-generated answer is determined to be an acronym, it is expanded into its canonical form (one example of normalization), where the canonical form of the model-generated answer is also matched against the existing answer options. The reverse may also be performed, where an abbreviated form of the model-generated answer (if available) is also determined and compared against the existing answer options. The abbreviation or expansion of existing answer options for purposes of comparison against the model-generated answer may also be performed.

In some embodiments, the matching of the model-generated answer to the existing answer options is a multi-step process. For example, a determination of whether there is an exact match between an existing answer option and the model-generated answer is determined. If there is an exact match, then the answer option that matches exactly with the model-generated answer is selected as the correct answer to the input multiple-choice question.

If there is not an exact match, normalization of the model-generated answer and/or existing answer options is performed. The normalized model-generated answer is then compared against the existing answer options to determine whether there is a match between an existing answer option and the normalized model-generated answer. As described in the example above, one type of normalization includes expanding model-generated answers that are abbreviations (e.g., "GDP" to "Gross Domestic Product"). Another example of normalization includes determining a stem form of the model-generated answer, and determining whether the stem form of the model-generated answer is present in any of the existing answer options.

In some embodiments, the model answer is compared against all answer options, and the options are ranked by score, where the top-ranked matching option is selected as the final option. If all options have scores below a threshold, then in some embodiments it is considered that the model-predicted answer does not match any of the answer options. In some embodiments, if no match is found, the model-predicted answer will not be shown to users. In other embodiments, if no match is found, the model-predicted answer is shown as-is, even without matching the existing answer options.

MCQ Question-and-Answer Model Implementation and Training

The following are embodiments of training the MCQ generative auto-solving model. As one example, the MCQ question-answering model described herein is implemented by adapting a model such as the Macaw (Multi-angle c (question) answering) model. Other models, such as models with transformer-based architectures may be used (e.g., FLAN, LLaMA, GPT, etc.).

The Macaw model is capable of providing various types of outputs given various types of inputs. For example, given a question and answer options, the Macaw model is capable of predicting an answer. If a question and a correct answer are provided, the Macaw model is capable of providing an explanation. If a set of answer options is provided as input, the Macaw model is capable of generating a question.

The following are embodiments of adapting a Macaw model for automatically solving and answering multiple-choice questions. As described above, in some embodiments, the multiple-choice question generative answering model described herein takes as input a multiple-choice question, answer options, and contextual passages, and provides as output a model-predicted answer. The answer option that most closely matches the model-predicted answer is then selected as the correct answer out of the answer options.

In some embodiments, the question-and-answer model is trained on training data that is optimized for answering questions in an academic context. In this way, the model is tuned for high performance academic-specific question answering. The use of such academic-optimized training data sets provides improvements over existing general-purpose question answering models, such as with respect to providing improved accuracy and quality of predicting answers to multiple-choice questions. For example, the multiple-choice question answering model described herein is fine-tuned on a data set that is highly applicable to question-answering for extracted questions. This fine-tuning provides improvements in delivering accurate answers over existing base level models.

Generating Training Data for the MCQ Question-Answering Model

The following are embodiments of constructing training data for fine-tuning an MCQ answer model. In some embodiments, de-noising is performed, where the de-noising is particular to the type of questions to be answered. In some embodiments, the training dataset is curated from subject matter experts. In some embodiments, various hyper-parameters are adjusted for improving model performance.

The following are further embodiments of determining a training data set for training the question-and-answer model described herein. In some embodiments, the training data set for training or building the question-and-answer model includes multiple-choice questions, answer options, and a label of the correct answer option. The training data may be obtained from various sources.

In some embodiments, the training data set is constructed using the question identification service described above. As described above, in some embodiments, the question identification service uses a question identification model to detect the bounds of a question in a document. For example, the question identification model provides a bounding box output in the form of question text and answer option text. In some embodiments, denoising is performed to remove noise from extracted content.

In some embodiments, the training data set is curated by evaluating questions that have tutor answers, which provide a "golden" standard of answers. In some embodiments, a question identification model identifies a question in a document. The identified question is routed to a tutor (e.g., in response to a user request or as part of a backend process to obtain or collect answers for identified unanswered questions). The tutor provided answer is injected into the boundary box as a question-and-answer pair. This pairing is added to the training data. That is, in some embodiments, the training data set is constructed of question-answer pairs, where the questions are automatically identified and extracted from documents, and where the answers may be extracted, collected, or otherwise determined.

Evaluation of the Question-Answering Model

In some embodiments, the accuracy of the question-answer model is evaluated. For example, the outputs of the auto-solver model are compared with answers provided from various other sources. As one example, outputs of the auto-solver model are compared with tutor-provided answers. In order to account for the possibility that the tutors themselves have inadvertently provided an incorrect answer, in some embodiments, a second round of evaluation is performed using answers provided by another source, such as subject matter experts. For example, questions are annotated with answers by subject matter experts. As shown in this example, in some embodiments, answers to multiple-choice questions are collected from additional answer sources. The outputs of the auto-solver model (question-answer model) for a multiple-choice question are evaluated against the set of answers collected from other sources.

In some embodiments, based on the evaluation, the question-answer model is updated. For example, if the auto-solver model output does not match to the answers collected from additional sources, then this detected discrepancy is used to perform additional fine-tuning of the model. The answers collected from additional sources may also be used as new training data for improving future iterations of the auto-solver model.

Confidence Assessment of Model-Generated Answers

As described above, the selection of an answer option is based on comparison against a model-predicted answer generated by the MCQ question answering model described herein. The following are embodiments of determining confidence measures with respect to the MCQ answering model, such as the likelihood that the question is correctly answerable by the question answering model, or the likelihood that the model-predicted answer is accurate. In some embodiments, only high-confidence answers are provided to users.

The following are various examples of obtaining confidence scores. As one example, the question-answer model provides a confidence score. For example, the generative question-answering model provides a probability score for each of the tokens that it outputs. The confidence score is used to verify the model-generated answer. In some embodiments, separate confidence scoring models are trained to evaluate the results or output of the question-answer model. As one example, a confidence score is generated from the Macaw-based model by multiplying the probabilities of a generated text sequence.

During answer prediction time, the fine-tuned question-answer model is run to predict an answer for the provided input that includes the question component, answer options component, and context components generated as described above.

In some embodiments, based on the model-generated answer, a selection of an answer option from the set of answer options extracted from the original question is performed.

In some embodiments, model-generated answers are evaluated to determine a confidence of the model-generated answer. In some embodiments, a confidence model is run to determine or evaluate a confidence of the answer generated by the model. In some embodiments, whether the model-generated answer is further used is dependent on the confidence (of correctness) determined for the model-generated answer. For example, only model-generated answers with a confidence greater than a threshold confidence level (e.g., 90%) are utilized (e.g., existing answer options are only compared against model-generated answers that are determined to have a high confidence of being correct).

The following are further embodiments regarding a confidence model that is configured to determine a measure of confidence that, for a given multiple-choice question and corresponding answer options, the auto-solver model will produce a correct answer.

In some embodiments, the confidence model is a model that is built separately from the question-answer (auto-solver) model. As one example, the confidence model is a BERT (Bidirectional Encoder Representations from Transformers)-based model. In various embodiments, the confidence measuring techniques may be variously adapted to accommodate any other type of language model implementation, as appropriate.

In some embodiments, the confidence model takes as input the question text and corresponding answer options, and outputs a probability score that is a measure of, or otherwise indicates, the likelihood that the auto-solver will answer the question correctly. As will be described in further detail below, the answerability confidence measure may be determined prior to running of the model (e.g., as a pre-filtering or pre-processing step to determine whether the question-answering model should be run), or during/after execution of the question-answering model. As will also be described in further detail below, embodiments of the answerability confidence model described herein predict the likelihood that the auto-solving system is able to answer a given question, where confidence scores determined by such a confidence model may then be used to reduce inference costs at scale.

The following are embodiments of building a confidence model. As one example, tutor-answered multiple-choice questions are obtained. The question text and answer options for each of the tutor-answered multiple-choice questions are used to build a confidence model. For example, the question text and answer options for the tutor-answered multiple-choice questions are passed to the auto-solver (generative question-answer) model. The auto-solver model provides as output model-generated answers to the question text and answer options.

The model-generated answers to the multiple-choice questions are compared against the tutor-provided answers (answers from other sources may also be collected). The questions for which the model-generated answers are determined to be wrong (e.g., different from the tutor-provided answers), and the questions for which the model-generated answers are determined to be correct (e.g., matching to the tutor-provided answers) are determined. The confidence model, or a confidence threshold, is built to determine, given the subset of questions that have been determined to have been correctly auto-answered (by the generative question-answer model), and the subset of questions that have been determined to have been incorrectly auto-answered (by the generative question-answer model), the likelihood that the auto-solver model will correctly answer certain types of questions.

In some embodiments, metadata is used to tag the type or class of questions. In some embodiments, the platform includes separate question classification models that are configured to classify the question into several classes (e.g., calculation/non-calculation, table/graph-based, and code). In some embodiments, the classifications are used in the question selection process. For example, it may be determined that the generative models are often not reliable for table and code-based questions. Examples of such models are a multiple-choice question (MCQ) classification model and a free-response question (FRQ) classification model, which are used to determine whether or not the question is a multiple-choice question. If the question is a multiple-choice question, then it is passed through the MCQ auto-solver (otherwise it is not passed through the MCQ auto-solver system described herein).

The following are embodiments of using confidence measures such as those described above as part of the auto-solving processing.

In some embodiments, model-generated answers whose confidence or probability score is below a threshold are filtered out. For example, the confidence score provided as output by the question-and answer model is compared against a threshold confidence. If the QA (question-answer) model confidence score is below the threshold, then the model-predicted answer is not used, and the multiple-choice question is not answered. In this case, the question is unanswered by the generative question-answering model. In some embodiments, model-generated answers whose confidence is above a threshold are kept. Such model-generated answers that have been answered with at least a threshold confidence are then compared against existing answer options to select a given answer option as the predicted answer to the question. For example, the matching or comparison of a model-generated answer to answer options is limited to those model-generated answers that were generated with at least a threshold confidence. In some embodiments, those model-generated answers that are of low confidence are filtered out or discarded.

The following are further embodiments regarding filtering of questions prior to generating answers to submitted questions. As will be described in further detail below, such filtering provides various efficiency benefits.

In some embodiments, prior to invoking the question-answering model, one or more confidence models (e.g., BERT-based confidence model described above) are run on the question to determine whether or not the question is answerable. The confidence model provides a degree of confidence as to whether the question is answerable or not. For example, the answerability confidence model determines a measure of the confidence that the question-answering model will be able to correctly answer the question.

Evaluating the answerability of the question (by the generative question-answering model) prior to submitting the question to the question-answering model provides various resource efficiency benefits. For example, the answerability confidence model is smaller and less expensive to run. If the question is determined to be not answerable with high confidence, then unnecessary running of the more expensive or resource intensive question-answering model can be avoided. For example, if the question is determined by the confidence model to not be answerable (within some degree of confidence), then the multiple-choice question is not submitted to the question-answering model for answering, and the auto-solving processing ends. This improves efficiency, as it avoids the inference time and cost of running unanswerable questions through the larger question-answer model (and passage retrieval steps).

As described above, in some embodiments, the answerability confidence model is run on a submitted question as a pre-processing step, prior to invoking or execution of the question-answering model.

In some embodiments, as described above, the answerability confidence model is trained based on the results of running questions through the question-answering model for which there is already a verified answer. Once the answerability confidence model is trained, it is run on a received question and set of answer options (e.g., as part of receiving the question and answering options, such as at 312).

As one example implementation, the answerability confidence model is implemented as a BERT-based model. In some embodiments, the BERT-based answerability confidence model is trained on the output of the Macaw-based question answering model. The following is an example of training the answerability confidence model. After the Macaw-based model provides a question and answer, a check is performed as to whether the answer provided by the Macaw-based model is correct or not (e.g., by comparing it to tutor-provided answers). Based on whether the answer generated by the Macaw-based model is correct or not, the BERT-based answerability model is trained to learn, given the question, whether the Macaw-based model answered the question correctly or not. The BERT-based answerability model is trained on a large dataset, and learns which questions are answerable, and which questions are not answerable. For example, the training data samples include questions and answers generated by the Macaw-based model, as well as labels indicating whether the generated answers for the questions were correct or not (where the labels may be generated, for example, by subject matter experts). For example, a sequence classification model such as BERT is trained or tuned on question and answer options text and a binary class label indicating if the question-answer model answered the question correctly or not. In some embodiments, the prediction probabilities determined by the answerability confidence model are used as a confidence score metric to determine which questions are answerable by the question-answer model. Metadata associated with the question, such as concept tags, subject matter, etc. may be used to further determine the answerability of questions with specific sets of characteristics.

As one example, examples are taken from where the question-answer model has provided the wrong or incorrect answer. For example, suppose that the question-answer model indicates, for a question, that the correct answer is answer option B. However, a tutor answer for the same question is C. Such questions with such discrepancies between the model-generated answer and a verified answer are taken as negative data points.

Example questions are also taken from where the model-generated answer and the verified answer (e.g., from tutor or subject matter expert) match. Such example questions are another example training data sample. This is an example of a positive data point where the model correctly answered a question.

The various multiple-choice questions for which it is determined whether a model-generated answer matched or did not match to an externally verified answer are used as training data samples for the confidence model.

In some embodiments, the confidence model training data sample is generated as follows. A set of multiple-choice questions is determined. In some embodiments, the set of multiple-choice questions includes multiple-choice questions with externally verified answers (e.g., tutor-verified answer options). Labels are attached to each multiple-choice question indicating whether the question-answering model had correctly or incorrectly predicted the answer to the given question.

In some embodiments, the multiple-choice questions used in the confidence model training data set do not overlap with questions used in the training of the question-answer model. For example, the question-answer model is trained on one cohort of questions. The confidence model training data set includes, for example, a development data set (with tutor-answered options) that the question-answer model has not previously seen (and has not been trained on).

The externally verified questions in the confidence model training data set are then passed as input to the question-answer model. Model-generated answers to the questions are then received from the question-answer model. For each question in the confidence model training data set, the following information is recorded:

The question text
The existing answer options
The verified answer option
The model-selected answer option selected based on the model-generated answer In some embodiments, a label is also included indicating whether there was a match or mismatch between the verified answer option and the model-selected answer option. The label may also indicate whether the question-answer model was correct in answering the question (based on whether the model-selected answer matched with the verified answer option, where the verified answer option is assumed to be correct).

The confidence model is then built or trained on the aforementioned training data set.

In some embodiments, the input to the confidence model includes question text and answer options. In some embodiments, the output of the BERT-based answerability confidence model is a score that indicates the answerability of a question by the Macaw-based generative answering model. As one example, the score is a value between 0 and 1, where a score for a question that is closer to one indicates that the question is answerable (by the Macaw-based model), and a score closer to zero indicates that the question is unanswerable by the Macaw-based model (or that the answer generated by the Macaw-based model is highly likely to be incorrect). Other types of scores may be utilized, as appropriate. The confidence model may be run before or after running of the question-answer model. For example, the confidence model may be run prior to the question-answer model (with the question text and answer options as input) to determine whether the question is likely to be correctly answerable by the question answer model. As another example, the confidence model is run subsequent to running of the question-answer model. In this case, for example, the confidence model is provided the question text and answer options as input, as well as a score provided by the question-answer model indicating what the question-answer model determines to be the probability of a model-selected answer to be correct.

For example, if based on the training, it is determined that the numeric questions tend to be incorrectly answered by the Macaw-based model, then the BERT-based model will provide a low score for numeric questions. In some embodiments, the BERT-based model is trained on questions of various types and formats, allowing the BERT-based model to provide confidence scores for various question types (e.g., of various subjects) and formats (e.g., numerical versus text).

As shown in the example above, the answerability confidence model determines, for a given question, a score indicating how likely the question-answering model will provide a correct answer.

In some embodiments, whether a model-selected answer determined by the question-answer model is provided as output is determined according to the confidence model. For example, a model-selected answer is not provided as output unless the probability of answering correctly determined by the confidence model is above a threshold (e.g., 95% confidence, or any other threshold as appropriate). The threshold confidence may be adjusted as appropriate.

The following is an example of integrating the answerability confidence model into a process of auto-solving a multiple-choice question. Suppose a question (or answer) is received. If the answerability confidence model provides a low score, then the question is not passed to the generative question-answering model. That is, filtering is performed using the answerability confidence model. In this way, questions that are difficult for the question-answering model to answer correctly are not passed to the Macaw-based model. This is beneficial from an efficiency standpoint, as the use of the Macaw-based model may be relatively expensive to utilize, and a large volume of questions may be submitted to the system. By using the answerability confidence model, a pre-filtering step is performed to avoid answering questions that are unanswerable (or difficult to answer correctly) by the question-answering model.

Further Embodiments of Training Generative Question-Answering Models

The following are further details regarding generative question-answering models. In some embodiments, the generative question-answering model is fine-tuned on the questions and passages data set in the internal content library. In some embodiments, there is a general question-answer model that is used to answer all types of questions. In other embodiments, there are multiple generative question-answer models. For example, the system includes subject-specific models that are built and trained. For example, the question-answering model is not only fine-tuned or trained on known questions, but is also further fine-tuned on specific subject groups, such as social sciences, life sciences, finances, business, etc. In some embodiments, the subject group models are used to answer submitted questions. In some embodiments, there are different models for different subjects. For example, there may be multiple groups of subjects, where each subject group is associated with a corresponding model.

The fine-tuning of subject-specific question-answer models on subject domains improves the performance of the question-answer models, such as with respect to accuracy and coverage. In some embodiments, coverage refers to the number of questions that the generative question-answering model(s) is capable of answering. In some embodiments, the coverage of a question-answering model is based on the percentage of questions that the question-answering model is able to answer correctly with a threshold level of confidence, where in some embodiments, the confidence or quality is based on the answerability modeling described above, as well as the confidence assigned to the output of the answers generated by the question-answering model. The confidence is based on the number or proportion or percentage of questions that pass the filtering from the answerability model, then of those questions, the subset of questions that the question-answering model is able to answer, and then of those answers generated by the question-answering model, the final subset of those questions where the generated answer was at least generated with a threshold amount of confidence.

As one example of determining coverage, suppose that there are 100 questions. The answerability model is first applied as a filtering step on the 100 questions. Suppose that the answerability model determines that 50 of the 100 questions are answerable by the question-answering model. This reduces the coverage to 50%. Now suppose that those 50 questions that are determined to be answerable by the question-answering model are provided to the question-answering model. Now suppose that of those 50 questions, the Macaw-based model was only able to provide an answer for 45 of those questions. This reduces the coverage of the question-answering system to 45% (45 out of original 100). In some embodiments, filtering is performed on the generated answers to filter out the answers that were generated with low confidence. For example, generated answers with a corresponding confidence (from the Macaw-based model output) below a threshold are filtered out. In other embodiments, only those questions that were answered with high confidence (or answered with confidence above a threshold confidence) are kept. Suppose that out of the 45 questions that were answerable by the question-answering model, only 30 questions were answered with high output confidence by the generative question-answering model. The overall, final coverage of the question-answering model is now 30 out of 100, or 30%.

FIG. 4A illustrates an embodiment of a data structure representation of a multiple-choice question. In this example, a data structure representation of a multiple-choice question stored or maintained in platform 100 is shown. Question text of the multiple-choice question is shown at 402. Existing answer options for the multiple-choice question are shown at 404. The question and existing answer options may be obtained in a variety of ways, embodiments of which are described above. Metadata associated with the question is also stored, such as a content identifier 406, content type 408 (e.g., question type-multiple-choice question in this example), and subject 410. In this example, a confidence threshold that is used for determining the answerability of the question is set at 412, and is adjustable in various embodiments. In this example, confidence threshold 412 is the minimum BERT threshold score. In some embodiments, only questions at or above this confidence threshold score (which indicates the likelihood that the question is correctly answerable by the question-answer model) will be passed to, and answered by, the question-answer model.

FIG. 4B illustrates an embodiment of an auto-solver output. In this example, a data structure representation of the output of the auto-solver system to the multiple-choice question of FIG. 4A is shown. The model-generated or model-predicted answer is shown at 422. The existing answer option (from answer options 404) selected by the auto-solver system is shown at 424 (e.g., based on a determination of the closest existing answer option to the model-predicted answer 422). A confidence value for the model-generated or selected answer is shown at (426). The confidence value 426 in this example is an output of the Macaw-based question-answer model (e.g., confidence that the answer provided by the question-answer model is correct). The contextual passages used by the question-answer model in answering the multiple-choice question are shown at 428. Metadata associated with the passage text is also shown (e.g., identifier of text, source of the text, etc.).

In this example, information linking the auto-solver output shown in FIG. 4B to the data structure representation of the multiple-choice question shown in FIG. 4A is maintained. For example, a matching content identifier (where the content is the multiple-choice question in this example) and content type are shown at 430. In this example, a pre-processing confidence is also shown at 432 (e.g., confidence determined by BERT-based model for the input question). As shown in this example, for this question, the pre-processing confidence exceeds the confidence threshold 412 shown in FIG. 4A. In this example, the likelihood of the generative question-answering model correctly answering this particular multiple-choice question exceeds the threshold, and the results of the generative question-answer model are permitted to be used.

Various metrics associated with computation of the answer are also shown at 434.

In various embodiments, the data structure representations shown in the examples of FIGS. 4A and 4B for an automatically-solved multiple-choice question are stored to content stores 110 (e.g., internal content library 134). Such information may then be used to deliver output, such as via user delivery interface 112, as described above.

Figure 5:
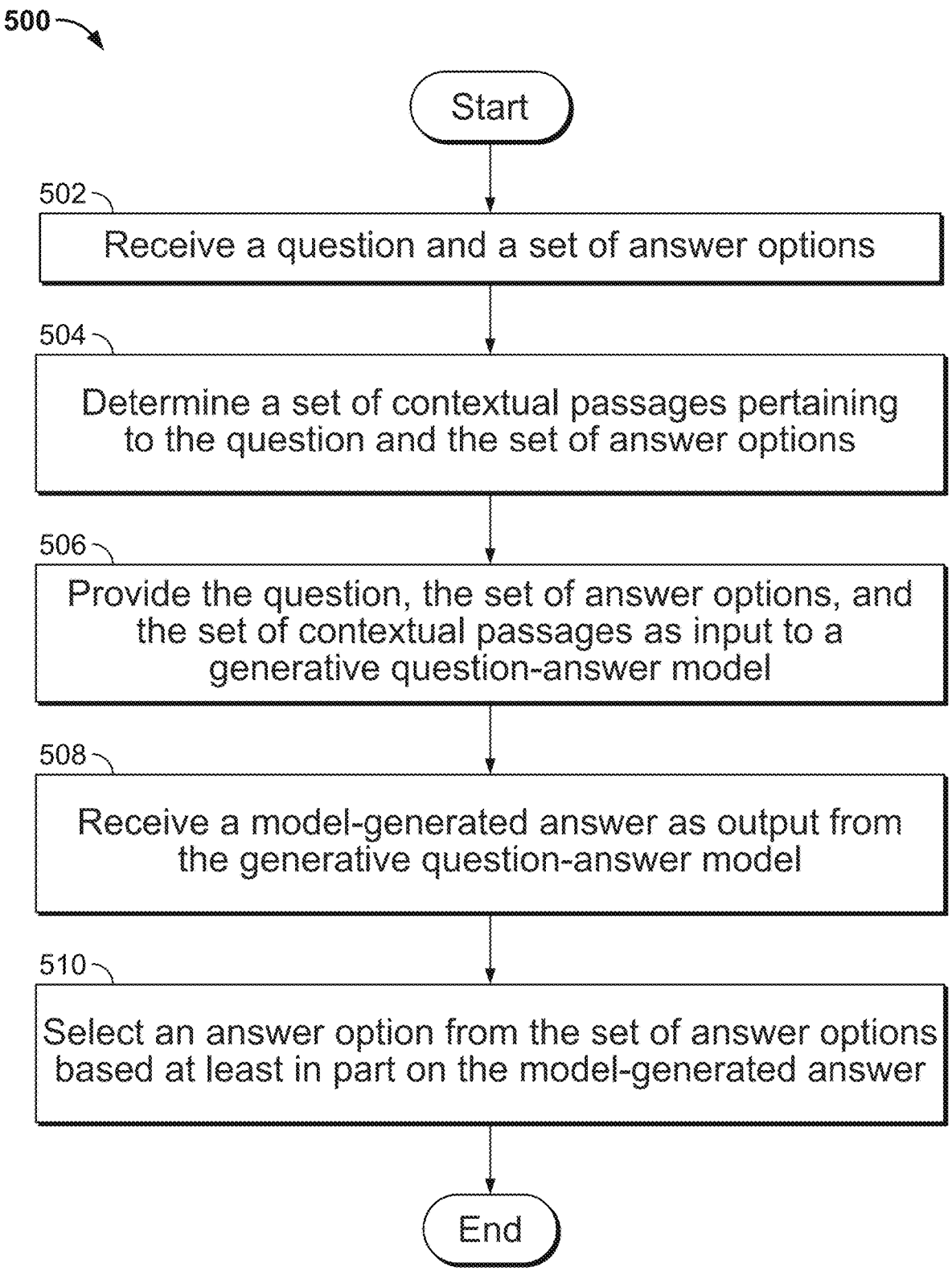
FIG. 5 is a flow diagram illustrating an embodiment of a system for automatically solving multiple-choice questions.

FIG. 5 is a flow diagram illustrating an embodiment of a system for automatically solving multiple-choice questions.

In some embodiments, process 500 is executed by auto-solver system 300 of FIG. 3. The process begins at 502 when a question and a set of answer options are received.

At 504, a set of contextual passages pertaining to the question and the set of answer options is determined. For example, a search for contextual passages pertaining to the question and the set of answer options is performed. As one example, the search is performed for each combination of the question and a given answer option in the set of answer options. In various embodiments, conceptual information, such as concept tags, is used in the search of contextual passages to produce an answer.

At 506, the question, the set of answer options, and the set of contextual passages are provided as input to a generative question-answer model. At 508, a model-generated answer is received as a result or output of the question-answer model. One example of a question-answer model is implemented based on a Macaw-based model. In some embodiments, there are multiple subject-specific models. Further details and embodiments of generative question-answering models are described above.

At 510, an answer option from the set of answer options is selected based at least in part on the model-generated answer. In some embodiments, subsequent to receiving the model-generated answer as a result from the generative question-answering model, the model-generated answer is compared to the existing answer options. The answer option that is the closest match to the model-generated answer is selected as the answer to the question. In some embodiments, the comparison includes performing character matching (e.g., based on character distance or string distance or edit distance between an existing answer option and the model-generated answer).

In some embodiments, the quality of the model-generated answer from the question-answer model is verified. In some embodiments, confidence scoring is performed to quantify the quality of the output of the question-answer model. As one example, a confidence scoring model is utilized. For example, in some embodiments, one or more measures of confidence associated with the answering of the question by the generative question-answer model are determined. One example of such a confidence measure includes a confidence provided as output by the generative question-answer model indicating a likelihood of correctness of the model-generated answer. Another example of a confidence measure is an answerability confidence measure that indicates a likelihood that the model is able to correctly answer the particular multiple-choice question.

Further Embodiments of Auto-Solving Multiple-Choice Questions

The following are embodiments of use cases and applications of the auto-solving multiple-choice question system described herein.

FIG. 6A illustrates an embodiment of a document. In this example document, a number of questions have been identified, such as by a question identification model as described above. In some embodiments, for each identified question, a bounding box around the identified question is generated. In some embodiments, a corresponding answer card or bubble is displayed next to the identified question. In some embodiments, pre-existing tutor answers that match with the question in the document are provided.

In some embodiments, using the generative question-answering techniques described herein, automatically generated answers are provided for an identified question that matches to an item in the content library of the system that includes questions, answers, and explanations.

In the example of FIG. 6A, an example of a multiple-choice question with an auto-generated answer has been selected at 602. In this example, upon selecting the question at 602, a learning panel with further information is presented, as will be described in further detail below in conjunction with FIG. 6B.

FIG. 6B illustrates an embodiment of a learning panel. In this example, the learning panel provides further contextual information regarding the question selected at 602 in the example document of FIG. 6A. In this example, an indication that the answer was automatically generated (e.g., using aggregated educational resources) is presented at 622.

In some embodiments, via the learning panel, an option is provided to users to obtain an explanation from a tutor. For example, if an explanation is missing for a given answer, and the user wants to learn more about the answer, such information may be provided to a tutor to obtain a further explanation on why an answer is correct.

In other embodiments, auto-generated explanations are provided along with answers. For example, as described above, contextual passages are used by the generative question-answering model to generate a model-generated answer. In some embodiments, those contextual passages are used to construct auto-generated explanations. As one example, the passage itself, if of sufficient quality, is provided as an explanation. As another example, contextual passages are provided as input to other generative models to produce an explanation for users. In some embodiments, attribution is performed to internal and external content that was used to generate explanations to answers presented to users.

In this example, recommendations of other similar problems are also shown.

FIG. 7 illustrates an embodiment of a learning panel. In this example, an auto-generated answer for a multiple-choice question identified in a document (and, for example, highlighted in the document by a user) is shown at 702. An auto-generated explanation is shown at 704. In this example, at 706, attribution to a specific content source used to provide a given answer and/or explanation is presented.

As described above, in some embodiments, a confidence score for the auto-generated answer is determined. In some embodiments, a confidence of the auto-generated answer is presented to provide users visibility into the quality of the auto-generated answers. As one example, a confidence tiering system is utilized to indicate the measure of confidence of the auto-generated answer. As one example, the confidence tiering system is based on the Macaw-based model confidence (confidence outputted by the question-answer model). For example, a high, medium, low tiering system may be utilized. In some embodiments, different confidence levels are associated with different color coding (e.g., green for high confidence answer labels, orange/yellow for medium confidence answer labels, and red for low confidence answer labels). An example of a confidence level or measure for an auto-generated answer is shown at 708. Other confidence indicating systems may utilized, such as numerical systems. In some embodiments, an explanation of what constitutes answers of certain confidence levels is provided. In some embodiments, auto-generated answers with a threshold level of confidence (e.g., high confidence) are provided as output. In other embodiments, auto-generated answers with other levels of confidence (e.g., medium confidence) are provided as well. In some embodiments, users are provided the ability to choose a minimum threshold confidence level for auto-generated answers that are presented.

In some embodiments, the interfaces of FIGS. 6A-6B and FIG. 7 are provided by user delivery interface 112 of platform 112100

Embodiments of auto-solving multiple-choice questions are described herein. The techniques described herein facilitate automatic selection, based on a predicted answer generated by a generative question-answering model, of a correct answer option from a set of answer options. In some embodiments, contextual passages relevant to a multiple-choice question to be answered are determined. In some embodiments, the contextual passages are determined by performing a search of passage indexes. In some embodiments, the search for relevant passages is further enhanced by performing concept tagging, as described above, which improves search relevancy. In some embodiments, the question-and-answer model described herein is fine-tuned on academic-specific data sets, such that the model is tuned for high-performance academic-specific question answering. This includes training the model with data that is optimized for question answering in academics. In some embodiments, the ability of the multiple-choice question auto-solver described herein to provide accurate and quality outputs (e.g., selection of an answer option) is further improved via the confidence evaluation techniques described herein, which in various embodiments are used to assess the quality of model-generated answers. In some embodiments, only answers that meet or exceed a threshold confidence are released or used to determine a selection of an existing answer option.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   receive a multiple-choice question and a corresponding plurality of answer options;
   perform a search for contextual passages pertaining to the multiple-choice question and the corresponding plurality of answer options at least in part by generating a passage search query that is based on a combination of a given answer option and the multiple-choice question;
   provide the multiple-choice question, the corresponding plurality of answer options, and the contextual passages resulting from the search as input to a generative question-answer model;
   receive a model-generated answer as output from the generative question-answer model; and
   select an answer option from the corresponding plurality of answer options based at least in part on the model-generated answer; and
   a memory coupled to the one or more processors and configured to provide the one or more processors with instructions.

2. The system recited in claim 1, wherein the one or more processors are further configured to determine a set of tags pertaining to at least one of the multiple-choice question or the corresponding plurality of answer options.

3. The system recited in claim 2, wherein performing the search for the contextual passages is based at least in part on the set of tags.

4. The system recited in claim 1, wherein generating the passage search query comprises concatenating text of the multiple-choice question with the given answer option.

5. The system recited in claim 1, wherein the one or more processors are further configured to rank the contextual passages resulting from the search.

6. The system recited in claim 1, wherein performing the search comprises performing a vector-based search.

7. The system recited in claim 6, wherein performing the vector-based search comprises performing embedding of the multiple-choice question and the given answer option.

8. The system recited in claim 1, wherein performing the search for the contextual passages comprises generating a plurality of passage queries, wherein each passage search query corresponds to a particular answer option in the corresponding plurality of answer options.

9. The system recited in claim 1, wherein selecting the answer option comprises comparing the model-generated answer to the corresponding plurality of answer options.

10. The system recited in claim 9, wherein the answer option that is selected comprises, among the corresponding plurality of answer options, a closest match to the model-generated answer.

11. A method, comprising:
receiving a multiple-choice question and a corresponding plurality of answer options;
performing a search for contextual passages pertaining to the multiple-choice question and the corresponding plurality of answer options at least in part by generating a passage search query that is based on a combination of a given answer option and the multiple-choice question;
providing the multiple-choice question, the corresponding plurality of answer options, and the contextual passages resulting from the search as input to a generative question-answer model;
receiving a model-generated answer as output from the generative question-answer model; and
selecting an answer option from the corresponding plurality of answer options based at least in part on the model-generated answer.

12. The method of claim 11, further comprising determining a set of tags pertaining to at least one of the multiple-choice question or the corresponding plurality of answer options.

13. The method of claim 12, wherein performing the search for the contextual passages is based at least in part on the set of tags.

14. The method of claim 11, wherein generating the passage search query comprises concatenating text of the multiple-choice question with the given answer option.

15. The method of claim 11, further comprising ranking the contextual passages resulting from the search.

16. The method of claim 11, wherein performing the search comprises performing a vector-based search.

17. The method of claim 16, wherein performing the vector-based search comprises performing embedding of the multiple-choice question and the given answer option.

18. The method of claim 11, wherein performing the search for the contextual passages comprises generating a plurality of passage queries, wherein each passage search query corresponds to a particular answer option in the corresponding plurality of answer options.

19. The method of claim 11, wherein selecting the answer option comprises comparing the model-generated answer to the corresponding plurality of answer options.

20. The method of claim 19, wherein the answer option that is selected comprises, among the corresponding plurality of answer options, a closest match to the model-generated answer.

21. A computer program product embodied in a non-transitory computer readable medium and comprising computer instructions for:
receiving a multiple-choice question and a corresponding plurality of answer options;
performing a search for contextual passages pertaining to the multiple-choice question and the corresponding plurality of answer options at least in part by generating a passage search query that is based on a combination of a given answer option and the multiple-choice question;
providing the multiple-choice question, the corresponding plurality of answer options, and the contextual passages resulting from the search as input to a generative question-answer model;
receiving a model-generated answer as output from the generative question-answer model; and
selecting an answer option from the corresponding plurality of answer options based at least in part on the model-generated answer.

* * * * *